US011862068B2

(12) United States Patent
Kim

(10) Patent No.: US 11,862,068 B2
(45) Date of Patent: *Jan. 2, 2024

(54) DISPLAY DEVICE AND METHOD OF DRIVING THE SAME

(71) Applicant: Samsung Display Co., Ltd., Yongin-Si (KR)

(72) Inventor: Sung Hwan Kim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 114 days.

This patent is subject to a terminal disclaimer.

(21) Appl. No.: 17/586,463

(22) Filed: Jan. 27, 2022

(65) Prior Publication Data

US 2022/0148498 A1 May 12, 2022

Related U.S. Application Data

(63) Continuation of application No. 16/903,454, filed on Jun. 17, 2020, now Pat. No. 11,238,781.

(30) Foreign Application Priority Data

Aug. 20, 2019 (KR) ........................ 10-2019-0101746

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2310/0278* (2013.01)

(58) Field of Classification Search
CPC .......... G09G 3/32; G09G 3/3233; G09G 3/20; G09G 3/2092; G09G 2310/0267; G09G 2310/0275; G09G 2310/0278; G09G 2310/0291; G09G 2310/0216; G09G 2310/08; G09G 2320/0233; G09G 2320/043; G09G 2320/029; G09G 2320/0295; G09G 2320/045;
(Continued)

(56) References Cited

U.S. PATENT DOCUMENTS

| | | | |
|---|---|---|---|
| 8,334,825 | B2 | 12/2012 | Kim |
| 8,624,805 | B2 | 1/2014 | McCreary |
| 9,779,666 | B2 | 10/2017 | Kwon et al. |

(Continued)

FOREIGN PATENT DOCUMENTS

| | | | |
|---|---|---|---|
| EP | 8336832 | A1 | 6/2018 |
| KR | 10-2015-0055786 | A | 5/2015 |

*Primary Examiner* — Christopher E Leiby
(74) *Attorney, Agent, or Firm* — Innovation Counsel LLP

(57) ABSTRACT

A display device may include: a first pixel coupled to a first scan line, a first data line, and a first sensing line; a second pixel coupled to the first scan line, a second data line, and a second sensing line; a first sensing channel corresponding to the first pixel and including a first sampling capacitor; and a second sensing channel corresponding to the second pixel and including a second sampling capacitor. During a first period, the first sensing channel may store a first sampling signal in the first sampling capacitor while the first sensing line is coupled to the first sensing channel, and the second sensing channel may store a second sampling signal in the second sampling capacitor while the second sensing line is disconnected from the second sensing channel.

18 Claims, 16 Drawing Sheets

< FIRST SENSING TIME: t1 >

(58) Field of Classification Search
CPC ... G09G 2300/0819; G09G 2300/0842; G09G 2300/0809; G09G 2300/0852
See application file for complete search history.

(56) References Cited

U.S. PATENT DOCUMENTS

| | | | | |
|---|---|---|---|---|
| 2008/0136338 | A1 | 6/2008 | Troccoli et al. | |
| 2015/0009204 | A1* | 1/2015 | Chaji | G09G 3/3233 345/76 |
| 2016/0155381 | A1 | 6/2016 | Kwon et al. | |
| 2017/0039952 | A1* | 2/2017 | Kim | G09G 3/3233 |
| 2018/0005581 | A1* | 1/2018 | Kim | G09G 3/3275 |
| 2018/0033366 | A1* | 2/2018 | Yoo | G09G 3/2003 |
| 2018/0114815 | A1* | 4/2018 | Lee | H10K 71/70 |
| 2018/0137819 | A1* | 5/2018 | An | G09G 3/3233 |
| 2018/0144683 | A1* | 5/2018 | Shin | G09G 3/3225 |
| 2018/0254006 | A1 | 9/2018 | Hwang et al. | |
| 2019/0051250 | A1* | 2/2019 | Lee | G09G 3/3233 |
| 2019/0079606 | A1* | 3/2019 | Kim | G06F 3/0412 |
| 2020/0020278 | A1 | 1/2020 | Lee | |
| 2020/0159385 | A1* | 5/2020 | Chung | G06F 3/042 |
| 2020/0193918 | A1* | 6/2020 | Hwang | G09G 3/3225 |
| 2020/0202787 | A1* | 6/2020 | Do | G09G 3/2007 |
| 2021/0043148 | A1* | 2/2021 | Lee | G09G 3/3291 |

* cited by examiner

<SENSING PERIOD>

< FIRST SENSING TIME: t1 >

< FIRST SENSING TIME: t1 >

< RESET AND CONVERTING TIME: t2 >

< RESET AND CONVERTING TIME: t2 >

< SECOND SENSING TIME: t3 >

< SECOND SENSING TIME: t3 >

< THRESHOLD VOLTAGE SENSING TIME: t3' >

DISPLAY DEVICE AND METHOD OF DRIVING THE SAME

CROSS-REFERENCE TO RELATED APPLICATION

This application is a continuation of U.S. patent application Ser. No. 16/903,454 filed on Jun. 17, 2020, which claims priority to Korean patent application number 10-2019-0101746 filed on Aug. 20, 2019, the entire contents of which are incorporated herein in their entireties by reference.

BACKGROUND

Field

Various embodiments of the present disclosure relate to a display device and a method of driving the same.

Description of Related Art

With the development of information technology, the importance of a display device that is a connection medium between a user and information has been emphasized. Owing to the importance of the display device, the use of various display devices such as a liquid crystal display device, an organic light-emitting display device, and a plasma display device has increased.

A display device may include a plurality of pixels and display various images using the plurality of pixels which emit light with various colors at various luminance levels.

Each of the plurality of pixels may include a pixel circuit having substantially the same structure. However, as surface areas of display devices increase, a process deviation depending on positions of pixels may be caused. Therefore, although transistors having the same function are employed in the respective pixels, the transistor may differ in characteristics such as mobility and threshold voltage.

SUMMARY

Various embodiments of the present disclosure are directed to a display device capable of compensating for different characteristics of transistors, and a method of driving the display device.

An embodiment of the present disclosure may provide a display device including: a first pixel comprising a first scanning transistor coupled to a first scan line and a first data line and a first sensing transistor coupled to a first sensing line; a second pixel comprising a second scanning transistor coupled to the first scan line and a second data line and a second sensing transistor coupled to a second sensing line; and a sensor, the sensor comprising: a first sensing channel corresponding to the first pixel and including a first sampling capacitor; and a second sensing channel corresponding to the second pixel and including a second sampling capacitor. During a first period, a first period, the first sensing channel may store a first sampling signal in the first sampling capacitor while the first sensing line is coupled to the first sensing channel, and the second sensing channel may store a second sampling signal in the second sampling capacitor while the second sensing line is disconnected from the second sensing channel.

In an embodiment, the first sensing channel may further include a first sensing capacitor. The second sensing channel may further include a second sensing capacitor. The first sensing channel may initialize the first sensing capacitor while disconnecting the first sensing line from the first sensing channel during a second period following the first period.

In an embodiment, the second sensing channel may initialize the second sensing capacitor while disconnecting the second sensing line from the second sensing channel during the second period.

In an embodiment, the first sensing channel may store a third sampling signal in the first sampling capacitor while disconnecting the first sensing line from the first sensing channel, and the second sensing channel may store a fourth sampling signal in the second sampling capacitor while connecting the second sensing line to the second sensing channel during a third period following the second period.

In an embodiment, a scan signal having a turn-on level may be applied to the first scan line during the first period and the third period.

In an embodiment, a scan signal having a turn-on level may be applied to the first scan line during the second period.

In an embodiment, a level of a data voltage applied to the first data line may be identical during the first period and the third period.

In an embodiment, a level of a data voltage applied to the second data line may be identical during the first period and the third period.

In an embodiment, the level of the data voltage applied to the first data line may be equal to the level of the data voltage applied to the second data line during the first period and the third period.

An embodiment of the present disclosure may provide a display device including a pixel and a sensing channel. The pixel may include: a first transistor including a gate electrode coupled to a first node, a first electrode, and a second electrode coupled to a second node; a storage capacitor including a first electrode coupled to the first node, and a second electrode coupled to the second node; a second transistor including a gate electrode coupled to a first scan line, a first electrode coupled to a data line, and a second electrode coupled to the first node; and a third transistor including a gate electrode coupled to a second scan line, a first electrode coupled to the second node, and a second electrode coupled to a sensing line. The sensing channel may include: a first switch including a first end coupled to the sensing line, and a second end coupled to a third node; a second switch including a first end coupled to the third node, and a second end coupled to an initialization power supply; an amplifier including a first input terminal coupled to a reference power supply; a third switch including a first end coupled to the third node, and a second end coupled to a second input terminal of the amplifier; and a sensing capacitor including a first electrode coupled to the second input terminal of the amplifier, and a second electrode coupled to an output terminal of the amplifier.

In an embodiment, the sensing channel may further include a sampling capacitor coupled to the sensing capacitor through at least one switch.

In an embodiment, the sensing channel may further include a fourth switch including a first end coupled to the first electrode of the sensing capacitor, and a second end coupled to the second electrode of the sensing capacitor.

In an embodiment, the sensing channel may include: a fifth switch including a first end coupled to the output terminal of the amplifier, and a second end coupled to a fourth node; and a sixth switch including a first end coupled to the fourth node, and a second end coupled to a first electrode of the sampling capacitor.

In an embodiment, the display device may further include an analog-digital converter. The sensing channel may further include a seventh switch including a first end coupled to the first electrode of the sampling capacitor, and a second end coupled to the analog-digital converter.

In an embodiment, the sensing channel may further include an eighth switch including a first end coupled to the third node, and a second end coupled to the fourth node.

An embodiment of the present disclosure may provide a method of driving a display device, including: applying a scan signal having a turn-on level to a first scan line coupled to a first pixel and a second pixel; storing a first sampling signal in a first sampling capacitor in a first sensing channel which corresponds to the first pixel during a first period while connecting the first sensing channel to the first pixel; and storing a second sampling signal in a second sampling capacitor in a second sensing channel which corresponds to the second pixel during the first period while disconnecting the second sensing channel from the second pixel.

In an embodiment, the method may further include initializing a first sensing capacitor while disconnecting d the first sensing channel from the first pixel during a second period following the first period.

In an embodiment, the method may further include initializing a second sensing capacitor while disconnecting the second sensing channel from the second pixel during the second period.

In an embodiment, the method may further include storing a third sampling signal in the first sampling capacitor while disconnecting the first sensing channel from the first pixel during a third period following the second period; and storing a fourth sampling signal in the second sampling capacitor while connecting the second sensing channel to the second pixel during the third period.

In an embodiment, a level of a data voltage applied to a first data line coupled to the first pixel may be equal to a level of a data voltage applied to a second data line coupled to the second pixel during the first period and the third period.

DETAILED DESCRIPTION

Figure 1:
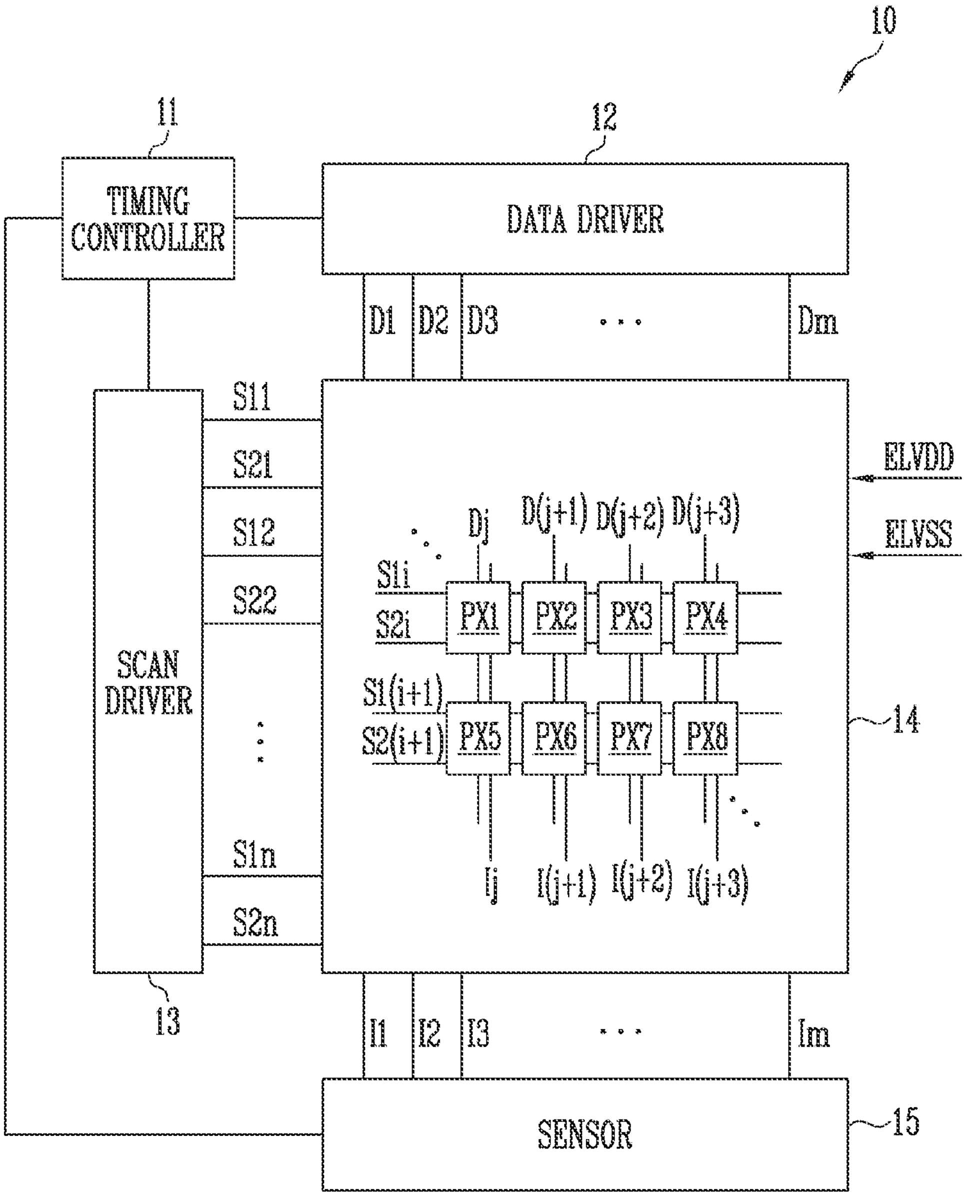
FIG. 1 is a diagram illustrating a display device in accordance with an embodiment of the present disclosure.

Hereinafter, embodiments of the present disclosure will be described in detail with reference to the attached drawings, such that those skilled in the art can easily implement the present inventive concept. The present disclosure may be implemented in various forms, and is not limited to embodiments to be described herein below.

In the drawings, parts which are not related to the present disclosure will be omitted to explain the present disclosure more clearly. Reference should be made to the drawings, in which similar reference numerals are used throughout the different drawings to designate similar components.

For reference, the size of each component and the thicknesses of lines illustrating the component are arbitrarily expressed for the sake of explanation, and the present disclosure is not limited to those illustrated in the drawings. In the drawings, the thicknesses of the components may be exaggerated to clearly express several layers and areas.

FIG. 1 is a diagram illustrating a display device 10 in accordance with an embodiment of the present disclosure.

The display device 10 in accordance with an embodiment of the present disclosure may include a timing controller 11, a data driver 12, a scan driver 13, a pixel area 14, and a sensor 15.

The timing controller 11 may receive gray scale values and control signals for each image frame from an external processor. The timing controller 11 may render the gray scale values in accordance with to specifications of the display device 10. For example, the external processor may provide a red gray-scale value, a green gray-scale value, and a blue gray-scale value for each unit dot. However, for example, in the case where the pixel area 14 has a pentile structure, because adjacent unit dots may share a pixel, the pixels may not be in one-to-one correspondence with the respective gray scale values. In this case, there is a need to render the gray scale values. If the pixels are in one-to-one correspondence with the respective gray scale values, the rendering of the gray scale values may not be required. Gray scale values that have been rendered or have not been rendered may be provided to the data driver 12. Furthermore, the timing controller 11 may provide control signals to the data driver 12, the scan driver 13, the sensor 15, etc. to display images.

The data driver 12 may generate data voltages to be provided to data lines D1, D2, D3, and Dm using the gray scale values and the control signals. For example, the data driver 12 may sample the gray scale values using a clock signal, and apply data voltages corresponding to the gray scale values to the data lines D1 to Dn one row at a time. Here, n is an integer greater than 0.

The scan driver 13 may receive a clock signal, a scan start signal, etc. from the timing controller 11 and generate first scan signals to be provided to first scan lines S11, S12, and S1*n* and second scan signals to be provided to second scan lines S21, S22, and S2*n*. Here, n is an integer greater than 0.

The scan driver 13 may sequentially supply the first scan signals each having a turn-on level pulse to the first scan lines S11, S12, and S1*n*. The scan driver 13 may sequentially supply the second scan signals each having a turn-on level pulse to the second scan lines S21, S22, and S2*n*.

For example, the scan driver 13 may include a first scan driver coupled to the first scan lines S11, S12, and S1*n*, and a second scan driver coupled to the second scan lines S21, S22, and S2*n*. The first scan driver and the second scan driver each may include scan stages having shift registers. The first scan driver and the second scan driver each may generate scan signals by sequentially transmitting a scan start signal having a turn-on level pulse to a subsequent stage under control of a clock signal.

In some embodiments, the first scan signals and the second scan signals may be the same as each other. In this case, the first scan line and the second scan line in each pixel may be coupled to the same node to receive a same scan signal. In this case, the scan driver 13 may include a single scan driver.

The sensor 15 may receive a control signal form the timing controller 11 and supply an initialization voltage to sensing lines I1, I2, I3, and Im and/or receive sensing signals from the sensing lines I1, I2, I3, and Im. For example, the sensor 15 may supply an initialization voltage to the sensing lines I1, I2, I3, and Im during an initialization period in a display period. For example, the sensor 15 may receive sensing signals from the sensing lines I1, I2, I3, and Im during a sensing period.

The sensor 15 may include sensing channels coupled to the sensing lines I1, I2, I3, and Im. For example, the sensing lines I1, I2, I3, and Im may be in one-to-one correspondence with the sensing channels in the sensor 15.

The pixel area 14 may include pixels PX1, PX2, PX3, PX4, PX5, PX6, PX7, and PX8. Each pixel may be coupled to a corresponding data line, a corresponding scan line, and a corresponding sensing line.

Figure 3:
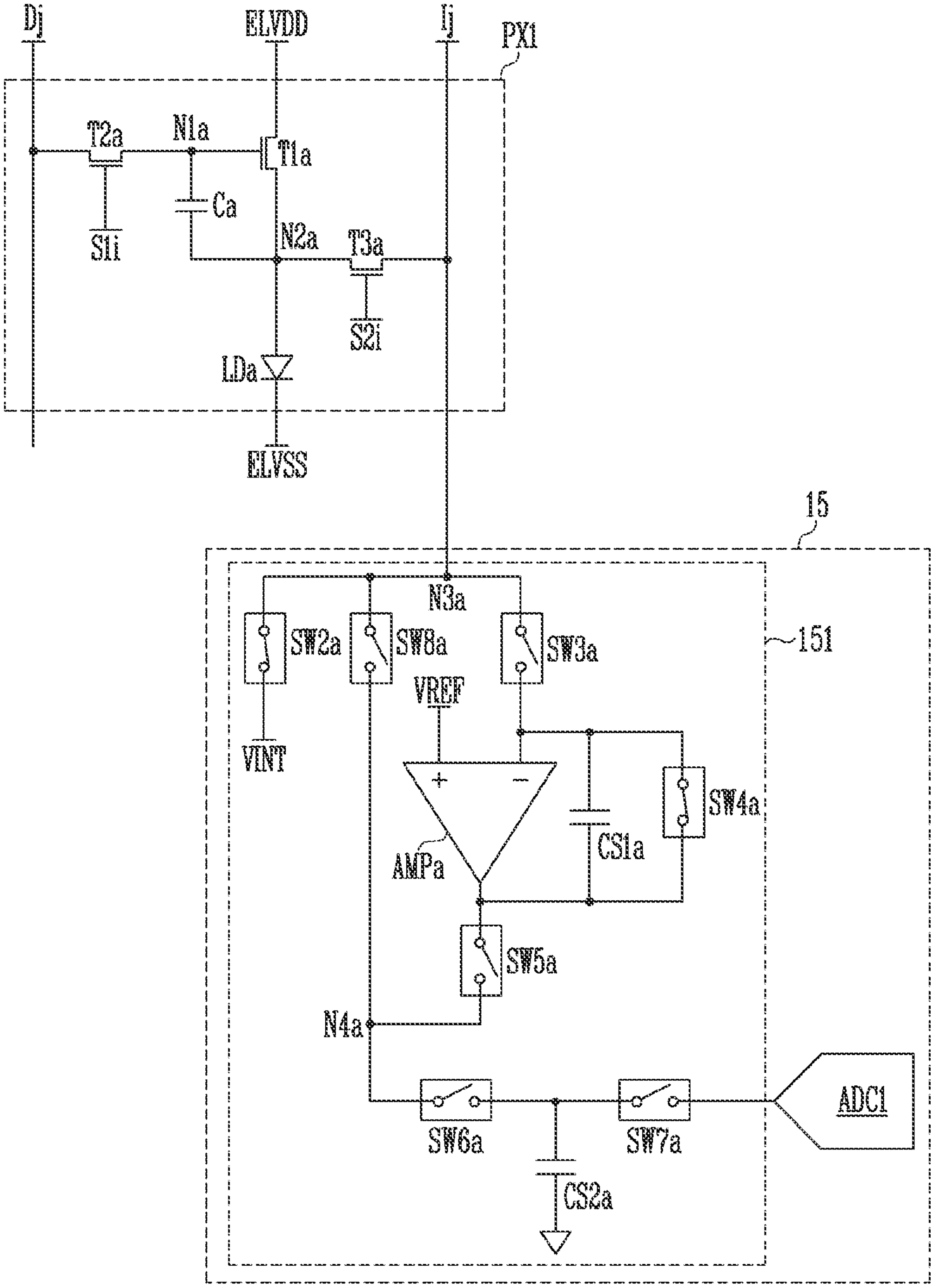

A first pixel PX1 may be coupled to scan lines S1*i* and S2*i*, a data line Dj, and a sensing line Ij as disclosed in FIG. 3. A second pixel PX2, a third pixel PX3, and a fourth pixel PX4 may be coupled to the same scan lines S1*i* and S2*i* as that of the first pixel PX1 as disclosed in FIG. 4. However, the first to fourth pixels PX1, PX2, PX3, and PX4 may be coupled to different data lines Dj, D(j+1), D(j+2), and D(j+3) and different sensing lines Ij, I(j+1), I(j+2), and I(j+3), respectively. Here, i and j each may be an integer greater than or equals to 0.

A fifth pixel PX5 may be coupled to scan lines S1(*i*+1) and S2(*i*+1), the data line Dj, and the sensing line Ij. A sixth pixel PX6, a seventh pixel PX7, and an eighth pixel PX8 may be coupled to the same scan lines S1(*i*+1) and S2(*i*+1) as that of the fifth pixel PX5. However, the fifth to eighth pixels PX5, PX6, PX7, and PX8 may be coupled to different data lines Dj, D(j+1), D(j+2), and D(j+3) and different sensing lines Ij, I(j+1), I(j+2), and I(j+3), respectively.

In an embodiment, the pixels PX1, PX2, PX3, and PX4 that are coupled to the same scan lines S1*i* and S2*i* may include a first group of pixels PX1 and PX3 (odd numbered pixels) and a second group of pixels PX2 and PX4 (even numbered pixels). The first group of pixels PX1 and PX2 and the second group of pixels PX2 and PX4 may be alternately arranged. For example, the first group of pixels PX1 and PX3 may include pixels coupled to odd-numbered data lines, and the second group of pixels PX2 and PX4 may include pixels coupled to even-numbered data lines.

In an embodiment, during a first period, the sensor 15 may store first sampling signals in first sampling capacitors CS2*a* in first sensing channels 151 which correspond to the first group of pixels PX1 and PX3. Here, the first sampling signals may include characteristic information, for example, mobility characteristic information, about the first group of pixels PX1 and PX3 and the common mode noise. Furthermore, during the first period, the sensor 15 may store second sampling signals in second sampling capacitors CS2*b* in sensing channels 152 which correspond to the second group of pixels PX2 and PX4. Here, the second sampling signals may not include characteristic information about the second group of pixels PX2 and PX4 but include the common mode noise only.

Since the first sampling signals and the second sampling signals have been stored during a same period (the first period), the first and second sampling signals may include a common mode noise which is included in the first sensing channels 151 and the second sensing channels 152. Therefore, characteristic information about the first group of pixels PX1 and PX3 which does not include the common mode noise may be obtained by removing the common mode noise stored in the second sampling capacitors CS2*b* from the first sampling signals stored in the first sampling capacitors CS2*a*.

During a second period following the first period, first sensing capacitors CS1*a* of the first sensing channels 151 may be initialized. Also, during the second period, second sensing capacitors CS1*b* of the second sensing channels 152 may be initialized. Depending on connection (e.g., whether or not a switch exists) between the sampling capacitors CS1*a* and CS1*b* and the sensing capacitors CS1*a* and CS1*b*, a process of acquiring the above-mentioned characteristic information may be performed during a period subordinate to the second period or during a period independent from the second period.

During a third period following the second period, the sensor 15 may store third sampling signals in the first sampling capacitors CS1*a* in the first sensing channels 151 which correspond to the first group of pixels PX1 and PX3. Here, the third sampling signals may not include characteristic information about the first group of pixels PX1 and PX3 but include the common mode noise only. Furthermore, during the third period, the sensor 15 may store fourth sampling signals in the second sampling capacitors CS1*b* in the second sensing channels 152 which correspond to the second group of pixels PX2 and PX4. Here, the fourth sampling signals may include characteristic information about the second group of pixels PX2 and PX4 and the common mode noise.

Since the third sampling signals and the fourth sampling signals have been stored during a same period (the third period), the third and fourth sampling signals may include a common mode noise which is included in the first sensing channels 151 and the second sensing channels 152. Therefore, characteristic information about the second group of pixels PX2 and PX4 which does not include the common mode noise may be obtained by removing the common mode noise stored in the first sampling capacitors CS2*a* from the second sampling signals stored in the second sampling capacitors CS2*b*.

Likewise, during a fourth period following the third period, the sensor 15 may store characteristic information about a first group of pixels PX5 and PX7 coupled to scan lines S1(*i*+1) and S2(*i*+1) next to the scan lines S1*i* and S2*i*. During a fifth period following the fourth period, a process of initializing the sensing capacitors may be performed. During a sixth period following the fifth period, the sensor 15 may store characteristic information about a second group of pixels PX6 and PX8.

Figure 2:
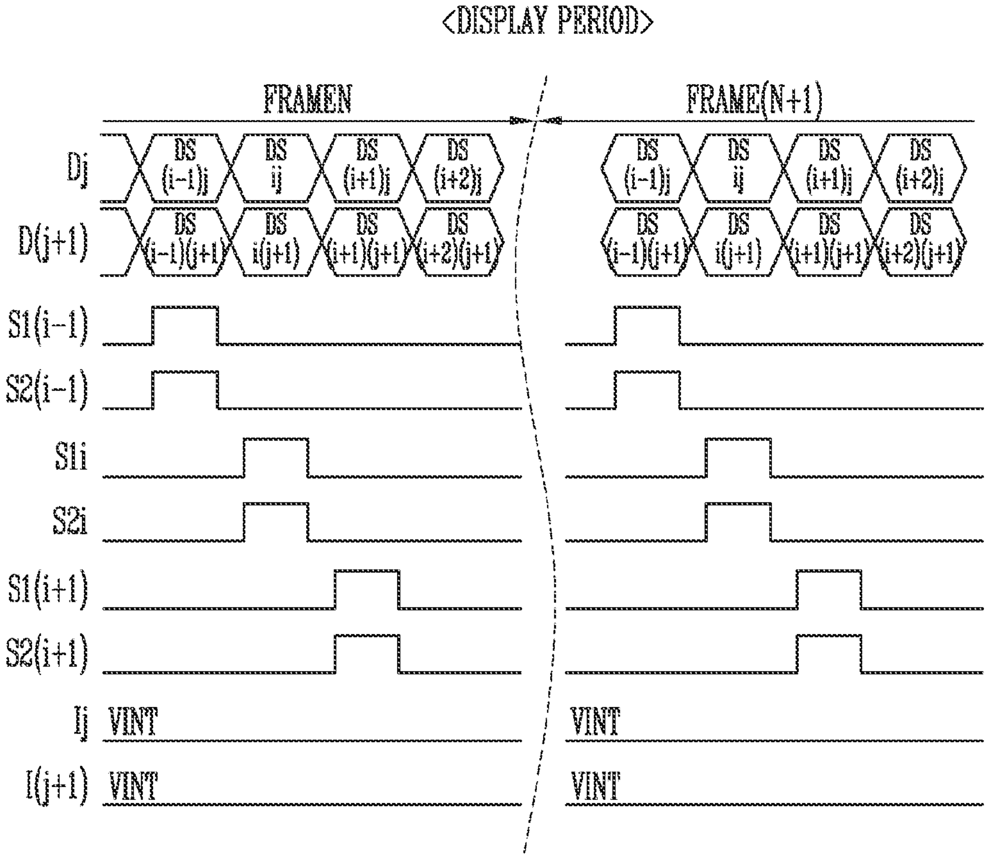
FIGS. 2, 3 and 4 are diagrams for describing a method of driving the display device during a display period in accordance with an embodiment of the present disclosure.
Figure 4:
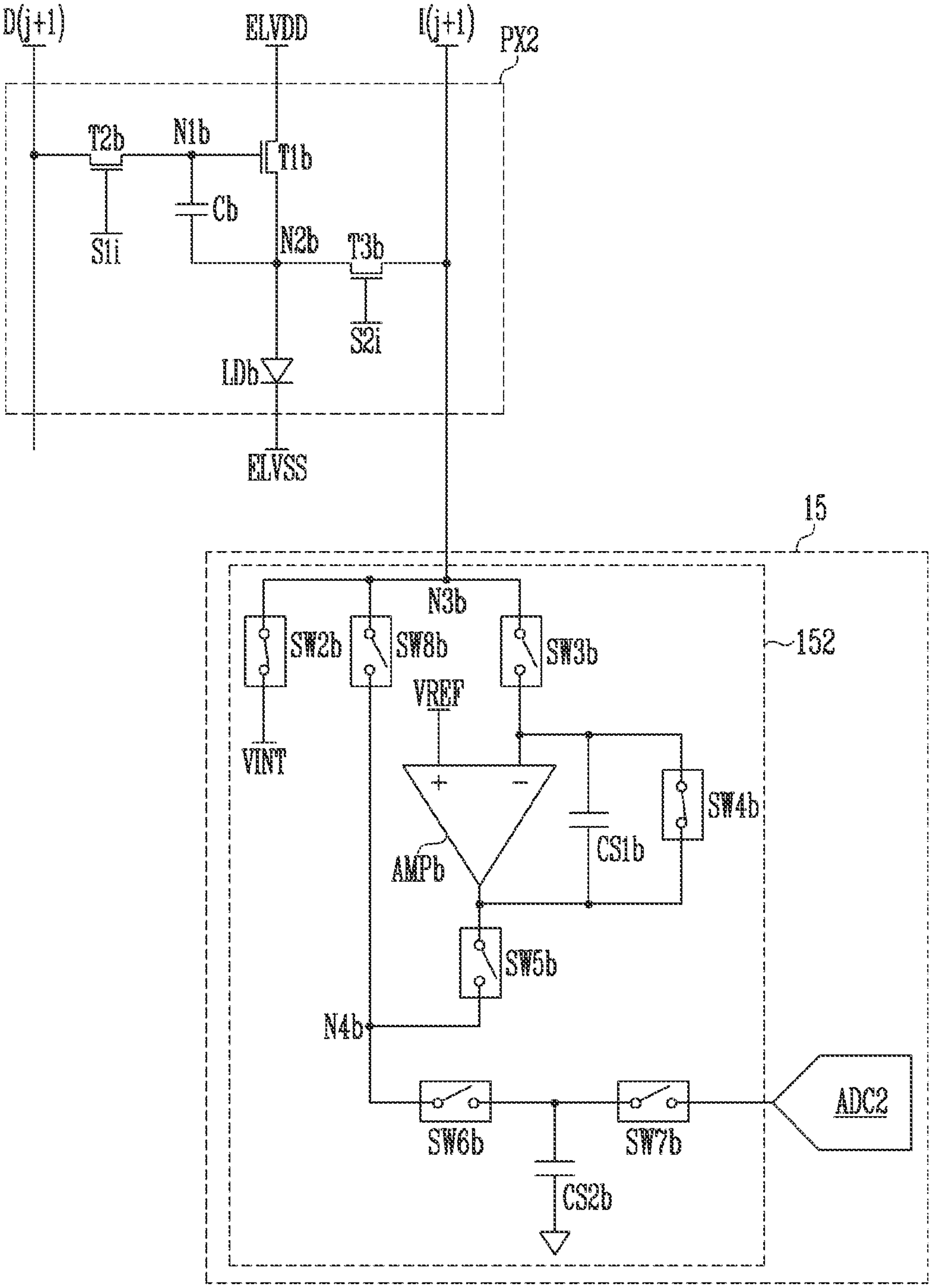

FIGS. 2 to 4 are diagrams for describing a method of driving the display device during a display period in accordance with an embodiment of the present disclosure.

FIG. 2 illustrates examples of waveforms of signals applied to scan lines S1(*i*−1), S2(*i*−1), S1*i*, S2*i*, S1(*i*+1), and S2(*i*+1), data lines Dj and D(j+1), and sensing lines Ij and I(j+1) pertaining to the first pixel PX1 and the second pixel PX2 during an N-th frame period FRAMEN and an N+1-th frame period FRAME(N+1).

An example of the configuration of a first pixel PX1 and a first sensing channel 151 will be described with reference to FIG. 3.

The first pixel PX1 may include transistors T1*a*, T2*a*, and T3*a*, a storage capacitor Ca, and a light emitting diode LDa.

The transistors T1*a*, T2*a*, and T3*a* each may be an N-type transistor. In an embodiment, the transistors T1*a*, T2*a*, and T3*a* each may be a P-type transistor. In an embodiment, the transistors T1*a*, T2*a*, and T3*a* each may be a complementary transistor which includes an N-type transistor and a P-type transistor. The term "P-type transistor" is a transistor in which an amount of current flowing through a channel increases when a voltage difference between a gate electrode and a source electrode increases in a negative direction. The term "N-type transistor" is a transistor in which an amount of current flowing through a channel increases when a voltage difference between a gate electrode and a source electrode increases in a positive direction. Each transistor may be a thin film transistor (TFT), a field effect transistor (FET), and a bipolar junction transistor (BJT).

A first transistor T1*a* may include a gate electrode coupled to a first node N1*a*, a first electrode coupled to a first power supply ELVDD, and a second electrode coupled to a second node N2*a*. The first transistor T1*a* may be referred to as "a driving transistor".

A second transistor T2*a* may include a gate electrode coupled to the first scan line S1*i*, a first electrode coupled to the data line Dj, and a second electrode coupled to the first node N1*a*. The second transistor T2*a* may be referred to as "a scanning transistor".

A third transistor T3*a* may include a gate electrode coupled to the second scan line S2*i*, a first electrode coupled to the second node N2*a*, and a second electrode coupled to the sensing line Ij. The third transistor T3*a* may be referred to as "a sensing transistor".

The storage capacitor Ca may include a first electrode coupled to the first node N1*a*, and a second electrode coupled to the second node N2*a*.

The light emitting diode LDa may include an anode coupled to the second node N2*a*, and a cathode coupled to a second power supply ELVSS.

Generally, the voltage of the first power supply ELVDD may be greater than that of the second power supply ELVSS. However, for example, in a special case where there is a need to prevent the light emitting diode LDa from emitting, the voltage of the second power supply ELVSS may be set to a value greater than that of the first power supply ELVDD.

The first sensing channel 151 may include switches SW2*a* to SW7*a*, a first sensing capacitor CS1*a*, a first amplifier AMPa, and a first sampling capacitor CS2*a*.

The second switch SW2*a* may include a first end coupled to a third node N3*a*, and a second end coupled to an initialization power supply VINT.

The first amplifier AMPa may include a first input terminal (e.g., a non-inverting terminal) coupled to a reference power supply VREF. The first amplifier AMPa may be formed of an operational amplifier.

The third switch SW3*a* may include a first end coupled to the third node N3*a* and a second end coupled to a second input terminal (e.g., an inverting terminal) of the first amplifier AMPa.

The first sensing capacitor CS1*a* may include a first electrode coupled to the second input terminal of the first amplifier AMPa and a second electrode coupled to an output terminal of the first amplifier AMPa.

The first sampling capacitor CS2*a* may be coupled to the first sensing capacitor CS1*a* through at least one switch (e.g., SW5*a* and SW6*a*).

The fourth switch SW4*a* may include a first end coupled to the first electrode of the first sensing capacitor CS1*a* and a second end coupled to the second electrode of the first sensing capacitor CS1*a*.

The fifth switch SW5*a* may include a first end coupled to the output terminal of the first amplifier AMPa and a second end coupled to a fourth node N4*a*.

The sixth switch SW6*a* may include a first end coupled to the fourth node N4*a* and a second end coupled to a first electrode of the first sampling capacitor CS2*a*.

The seventh switch SW7*a* may include a first end coupled to the first electrode of the first sampling capacitor CS2*a* and a second end coupled to an analog-digital converter ADC1.

The eighth switch SW8*a* may include a first end coupled to the third node N3*a*, and a second end coupled to the fourth node N4*a*.

The sensor 15 may include the first sensing channel 151 and the analog-digital converter ADC1. For example, the sensor 15 may include analog-digital converters ADC1 and ADC2. The number of the analog-digital converters ADC1 and ADC2 may correspond to the number of sensing channels 151 and 152. In an embodiment, the sensor 15 may include a single analog-digital converter, and convert sampling signals stored in the sensing channels in a time-sharing manner.

Transistors T1*b*, T2*b*, and T3*b*, a storage capacitor Cb, and a light emitting diode LDb that are included in the second pixel PX2 of FIG. 4 have substantially the same configurations as those of the transistors T1*a*, T2*a*, and T3*a*, the storage capacitor Ca, and the light emitting diode LDa that are included in the first pixel PX1; therefore, repetitive explanation thereof will be omitted.

Furthermore, switches SW2*b* to SW7*b*, a second sensing capacitor CS1*b* a second amplifier AMPb, and a second sampling capacitor CS2*b* that are included in the second sensing channel 152 of FIG. 4 have substantially the same configurations as those of the switches SW2*a* to SW7*a*, the first sensing capacitor CS1*a*, the first amplifier AMPa, and the first sampling capacitor CS2*a* that are included in the first sensing channel 151; therefore repetitive explanation thereof will be omitted.

Referring to FIG. 2 again, during a display period, for example, a data writing period, the sensing lines Ij and I(j+1) are coupled with the initialization power supply VINT. During the display period, the second switches SW2*a* and SW2*b* may be turned on.

During the display period, the third switches SW3*a* and SW3*b* and the eighth switches SW8*a* and SW8*b* may be turned off. Hence, the sensing lines Ij and I(j+1) may be prevented from being coupled to other power supplies (e.g., VREF).

During the display period, data voltages DS(i−1)j to DS(i+2)(j+1) may be sequentially applied to the data lines Dj and D(j+1). Scan signals having a turn-on level (high level) may be sequentially applied to the first scan lines S1(*i*−1), S1*i*, and S1(*i*+1). Also, scan signals having a turn-on level may be applied to the second scan lines S2(*i*−1), S2*i*, and S2(*i*+1) in synchronization with the first scan signals applied to the first scan lines S1(*i*−1), S1*i*, and S1(*i*+1). In an embodiment, during the display period, for example, the data writing period, scan signals having a turn-on level may always be applied to the second scan lines S2(*i*−1), S2*i*, and S2(*i*+1).

For example, if scan signals having a turn-on level are applied to the i-th first scan line S1*i* and the i-th second scan line S2*i*, the second transistors T2*a* and T2*b* and the third transistors T3*a* and T3*b* may be turned on. Therefore, a voltage corresponding to a difference between a data voltage DSij and the initialization power supply VINT is stored to the storage capacitor Ca of the first pixel PX1 and a voltage corresponding to a difference between a data voltage DSi (j+1) and the initialization power supply VINT is stored to the storage capacitor Cb of the second pixel PX2.

In the first pixel PX1, depending on a difference in voltage between the gate electrode and the source electrode of the first transistor T1*a*, the amount of driving current flowing through the light emitting diode LDa from the first power supply ELVDD to the second power supply ELVSS may be determined. The emission luminance of the light emitting diode LDa may be determined depending on the amount of driving current.

In the second pixel PX2, depending on a difference in voltage between the gate electrode and the source electrode of the first transistor T1*b*, the amount of driving current flowing through the light emitting diode LDb from the first power supply ELVDD to the second power supply ELVSS may be determined. The emission luminance of the light emitting diode LDb may be determined depending on the amount of driving current.

Subsequently, in a display period, if scan signals having a turn-off level are applied to the i-th first scan line S1*i* and the i-th second scan line S2*i*, the second transistors T2*a* and T2*b* and the third transistors T3*a* and T3*b* may be turned off. Therefore, regardless of a change in voltage of the data lines Dj and D(j+1), a difference in voltage between the gate electrodes and the source electrodes of the first transistors T1*a* and T1*b* may be maintained by the storage capacitors Ca and Cb, and the emission luminance of the light emitting diodes LDa and LDb may be maintained during the display period.

Figure 5:
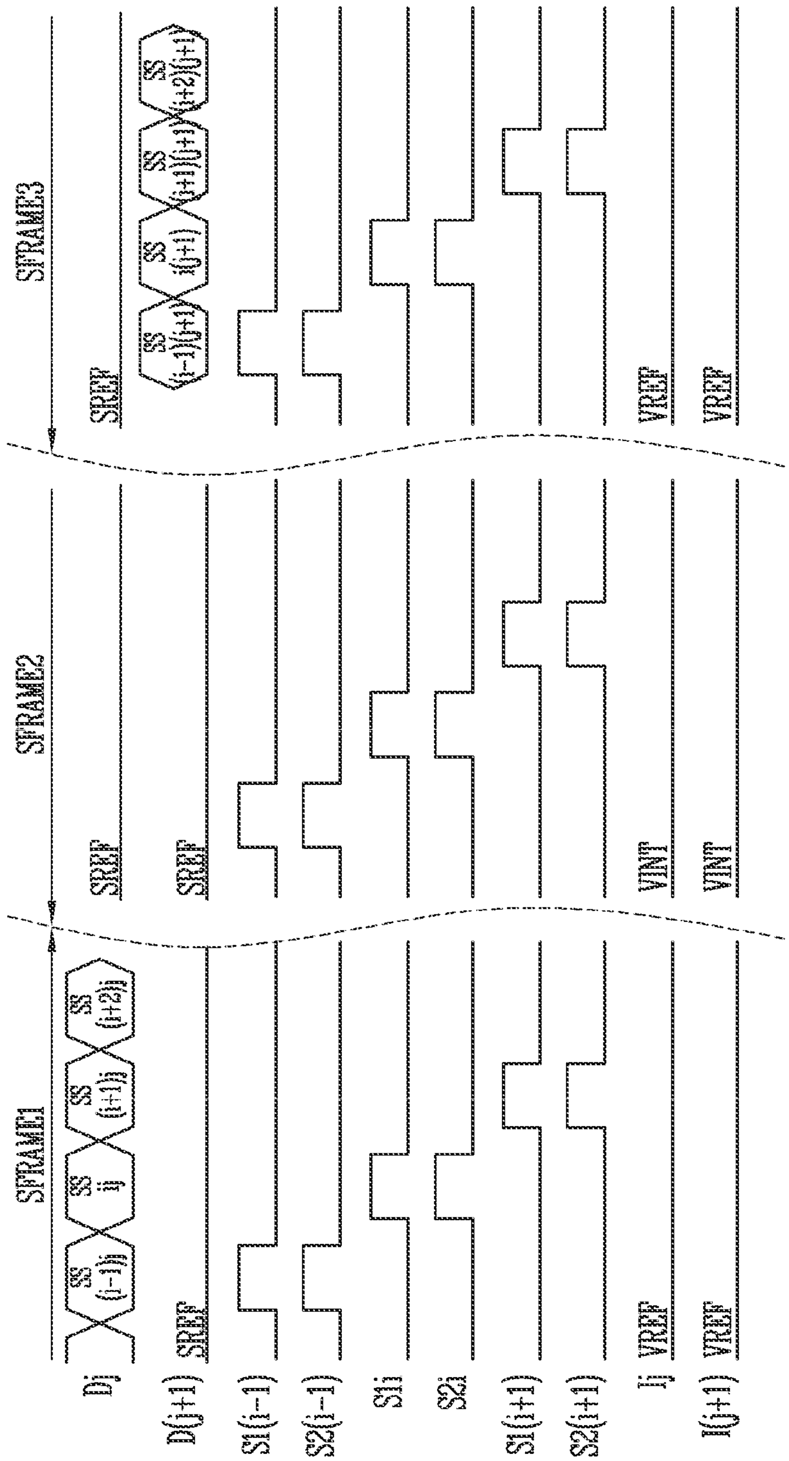
FIGS. 5, 6 and 7 are diagrams for describing a method of driving the display device during a sensing period in accordance with an embodiment of the present disclosure.
Figure 6:
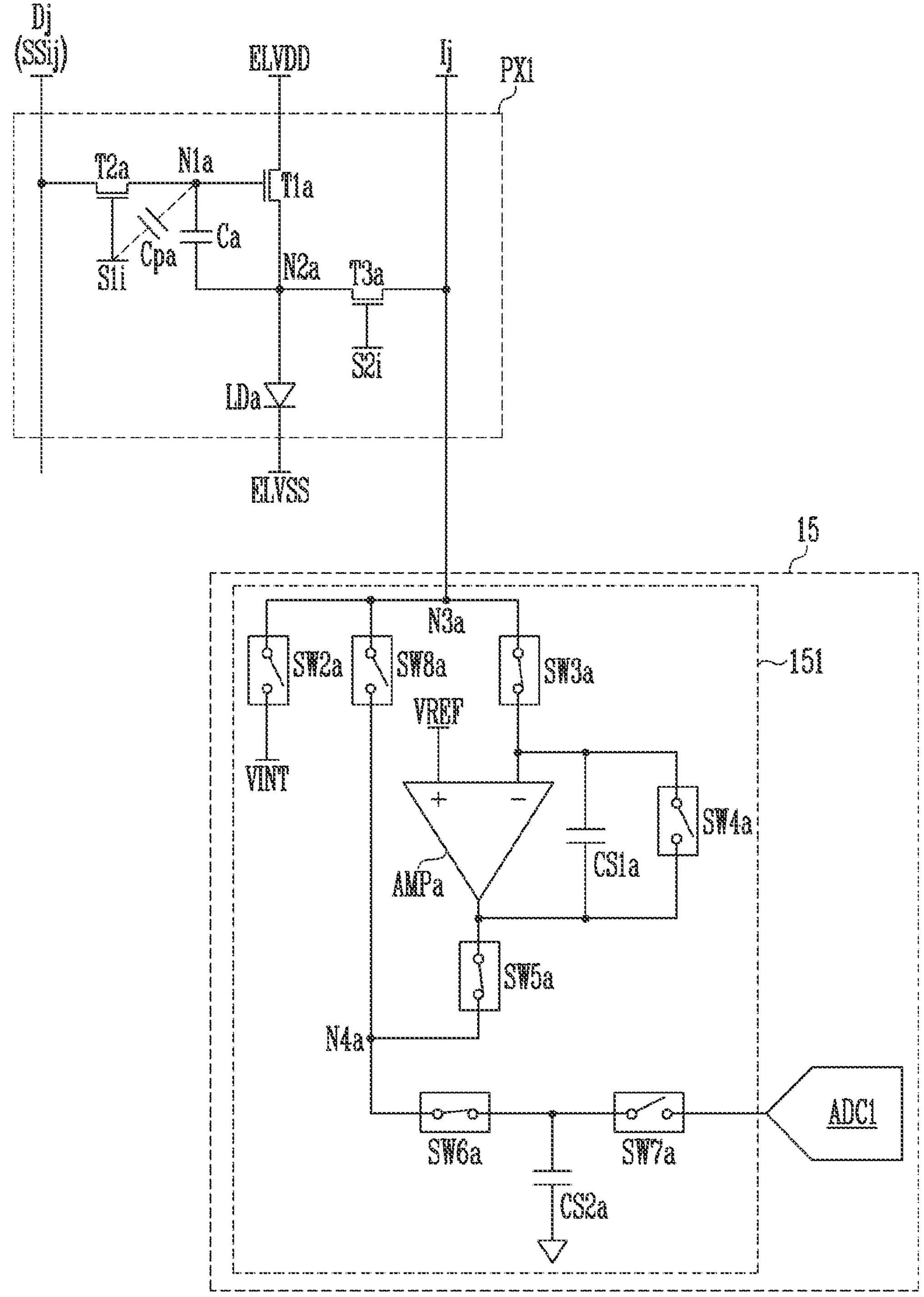
Figure 7:
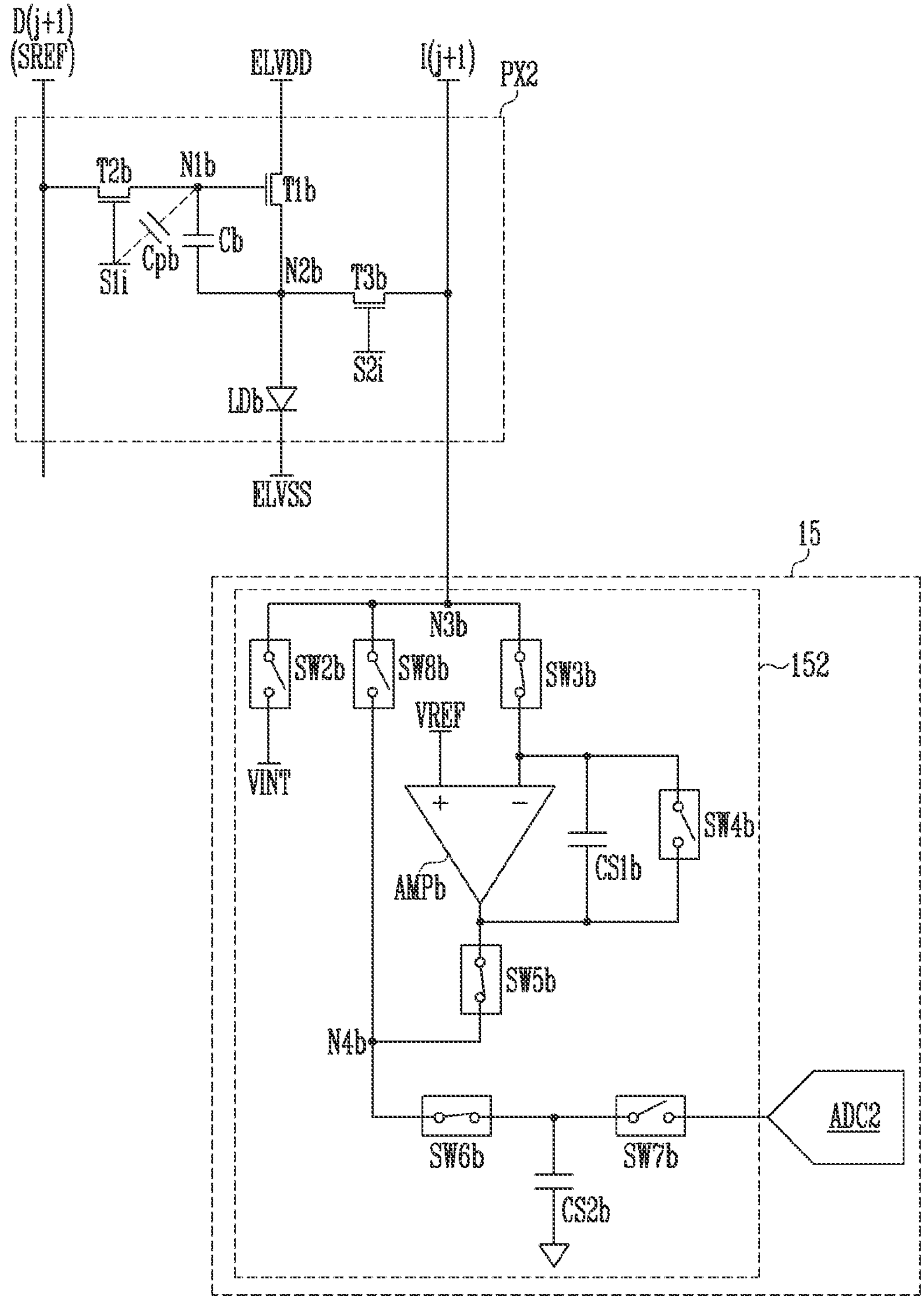

FIGS. 5 to 7 are diagrams for describing a method of driving the display device during a sensing period in accordance with an embodiment of the present disclosure.

Referring to FIG. 5, the sensing period of the display device 10 in accordance with an embodiment of the present disclosure may include at least three sensing frame periods SFRAME1, SFRAME2, and SFRAME3.

During the first sensing frame period SFRAME1, sensing voltages SS(i−1)j to SS(i+2)j may be sequentially applied to the j-th data line Dj. Here, a sensing reference voltage SREF may be applied to the j+1-th data line D(j+1).

Furthermore, the sensing lines Ij and I(j+1) may be coupled to the reference power supply VREF. Referring to FIGS. 6 and 7, the third switches SW3*a* and SW3*b* may be turned on. Since the reference power supply VREF is applied to the non-inverting terminals and the inverting terminals of the first amplifiers AMPa, the non-inverting terminals and the inverting terminals of the first amplifiers AMPa are in a virtual short state.

If scan signals having a turn-on level are applied to the i-th first scan line S1*i* and the i-th second scan line S2*i*, the second transistors T2*a* and T2*b* and the third transistors T3*a* and T3*b* may be turned on.

Hence, a sensing voltage SSij may be applied to the first node N1*a* of the first pixel PX1, and a voltage of the reference power supply VREF may be applied to the second node N2*a*. A difference in voltages between the sensing voltage SSij and the reference power supply VREF may be greater than the threshold voltage of the first transistor T1*a*. Hence, the first transistor T1*a* may be turned on, so that sensing current may flow through a sensing current path connected between the first power supply ELVDD and the first electrode of the first sensing capacitor CS1*a* (the inverting terminal of the first amplifier AMPa) through the first transistor T1*a*, the second node N2*a*, the third transistor T3*a*, the third node N3*a* and the third switch SW3*a*. The sensing current may include characteristic information of the first transistor T1*a* and the common mode noise.

The sensing current flowing through the first transistor T1*a* may correspond to the equation 1 below:

$$Id = \frac{1}{2}(u \times Co)\left(\frac{W}{L}\right)(Vgs - Vth)^2 \quad \text{[Equation 1]}$$

Here, Id may denote sensing current flowing through the first transistor T1*a*. u may denote mobility. Co may denote a capacitance formed by a channel, an insulating layer, and the gate electrode of the first transistor T1*a*. W may denote a width of the channel of the first transistor T1*a*. L may denote a length of the channel of the first transistor T1*a*. Vgs may denote a difference in voltage between the gate electrode and the source electrode of the first transistor T1*a*. Vth may denote a threshold voltage value of the first transistor T1*a*.

Here, Co, W, L each may be a constant. Vth may be detected by a predetermined detection method (e.g., refer to FIGS. 15 and 16). Vgs may be a difference in voltage between the sensing voltage SSij and the reference power supply VREF. The voltage of the third node N3*a* is fixed. Hence, as the sensing current Id is increased, the voltage of the fourth node N4*a* is reduced. The voltage of the fourth node N4*a* may be stored in the first sampling capacitor CS2*a* as a sampling signal. Subsequently, after turning on the seventh switch SW7*a*, the analog-digital converter ADC1 may calculate the magnitude of the sensing current Id by converting the sampling signal stored in the first sampling capacitor CS2*a* into a digital signal. Therefore, the mobility u that is the remaining variable may be calculated.

However, the first sensing capacitor CS1*a* may be vulnerable to noise because the capacitance thereof is smaller than that of other elements (e.g., a parasitic capacitance of the sensing line Ij). In an embodiment of the present disclosure, a sampling signal of the adjacent second sensing channel 152 may be further used, and a sampling signal of the first sensing channel 151 and a sampling signal of the second sensing channel 152 may be processed to obtain the characteristic information of the first transistor T1*a* by removing the common mode noise.

Hence, the sensing reference voltage SREF may be applied to the first node N1*b* of the second pixel PX2, and the voltage of the reference power supply VREF may be applied to the second node N2*b*. A difference in voltage between the sensing reference voltage SREF and the reference power supply VREF may be less than the threshold voltage of the first transistor T1*b*. Therefore, the first transistor T1*b* may be turned off, and only noise current may flow through the second sensing channel 152. The noise current may not include the characteristic information of the first transistor T1*b* but include the common mode noise only. Therefore, the sampling signal stored in the second sampling capacitor CS2*b* may only include the common mode noise information without including the characteristic information of the first transistor T1*b*.

Thus, mobility characteristic information of the first transistor T1*a* of the first pixel PX1 from which the common mode noise has been removed may be acquired by sampling signals acquired during the first sensing frame period SFRAME1. Likewise, during the first sensing frame period SFRAME1, mobility characteristic information of a first transistor of the third pixel PX3 from which the common mode noise has been removed may be acquired.

During the second sensing frame period SFRAME2, the pixels may be initialized. For the sake of explanation, the following description will be made only for the first pixel PX1 and the second pixel PX2. For example, the sensing reference voltage SREF may be applied to the data lines Dj and D(j+1), and the sensing lines Ij and I(j+1) may be coupled with the initialization power supply VINT. Scan signals having a turn-on level may be sequentially supplied to the scan lines S1(*i*−1) to S2(*i*+1). In an embodiment, the scan signals having a turn-on level may be simultaneously supplied to all of the scan lines S1(*i*−1) to S2(*i*+1). Hence, the sensing reference voltage SREF may be stored in the first nodes N1*a* and N1*b* of the pixels PX1 and PX2, and the voltage of the initialization power supply VINT may be applied to the second nodes N2*a* and N2*b*.

A parasitic capacitance Cpa may be present between the first node N1*a* of the first pixel PX1 and the i-th first scan line S1*i*. Also, a parasitic capacitance Cpb may be present between the first node N1*b* of the second pixel PX2 and the i-th first scan line S1*i*. Hence, if the pixels are not initialized during the second sensing frame period SFRAME2, the sensing voltage SSij pre-stored in the first node N1*a* of the first pixel PX1 may affect a sensing voltage SSi(j+1) to be written to the first node N1*b* of the second pixel PX2 during the third sensing frame period SFRAME3. In other words, a horizontal crosstalk issue may occur.

Mobility characteristic information of the first transistor T1*b* of the second pixel PX2 from which the common mode noise has been removed may be acquired by sampling signals acquired during the third sensing frame period SFRAME3. Likewise, during the third sensing frame period SFRAME3, mobility characteristic information of a first transistor of the fourth pixel PX4 from which the common mode noise has been removed may be acquired. The third sensing frame period SFRAME3 is similar to the first sensing frame period SFRAME1 except only the fact that sensing target pixels are different pixels PX2 and PX4; therefore, repetitive explanation thereof will be omitted.

FIGS. 8 to 14 are diagrams for describing a method of driving the display device during a sensing period in accordance with an embodiment of the present disclosure.

Figure 8:
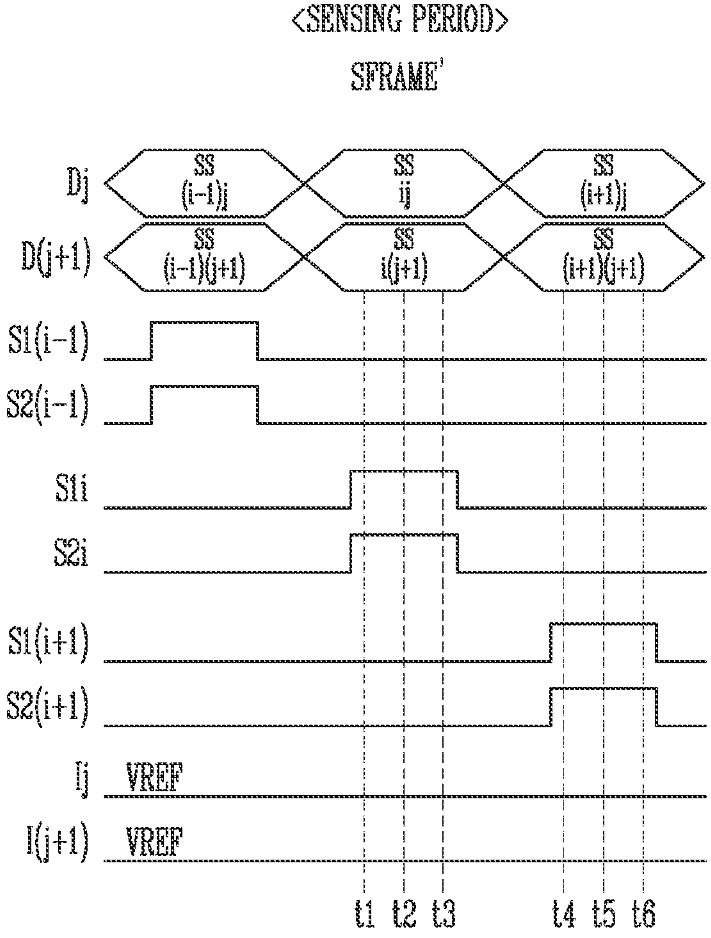
FIGS. 8, 9, 10, 11, 12, 13 and 14 are diagrams for describing a method of driving the display device during a sensing period in accordance with an embodiment of the present disclosure.

Referring to FIG. 8, during a sensing frame period SFRAME', sensing voltages SS(i−1)j, SSij, and SS(i+1)(j) may be sequentially supplied to the j-th data line Dj, and sensing voltages SS(i−1)(j+1), SSi(j+1), and SS(i+1)(j+1) may be sequentially supplied to the j+l-th data line D(j+1). In synchronization with supply timings of the sensing voltages SS(i−1)(j+1), SSi(j+1), and SS(i+1)(j+1), scan signals having a turn-on level may be sequentially supplied to the first scan lines S1(*i*−1), S1*i*, and S1(*i*+1), and scan signals having a turn-on level may be sequentially supplied to the second scan lines S2(*i*−1), S2*i*, and S2(*i*+1). The sensing lines Ij and I(j+1) may be coupled with the reference power supply VREF.

A first time t1 may be a time during the first period. A second time t2 may be a time during the second period. A third time t3 may be a time during the third period. The first period, the second period, and the third period may be sequential time and may not overlap with each other.

Figure 9:
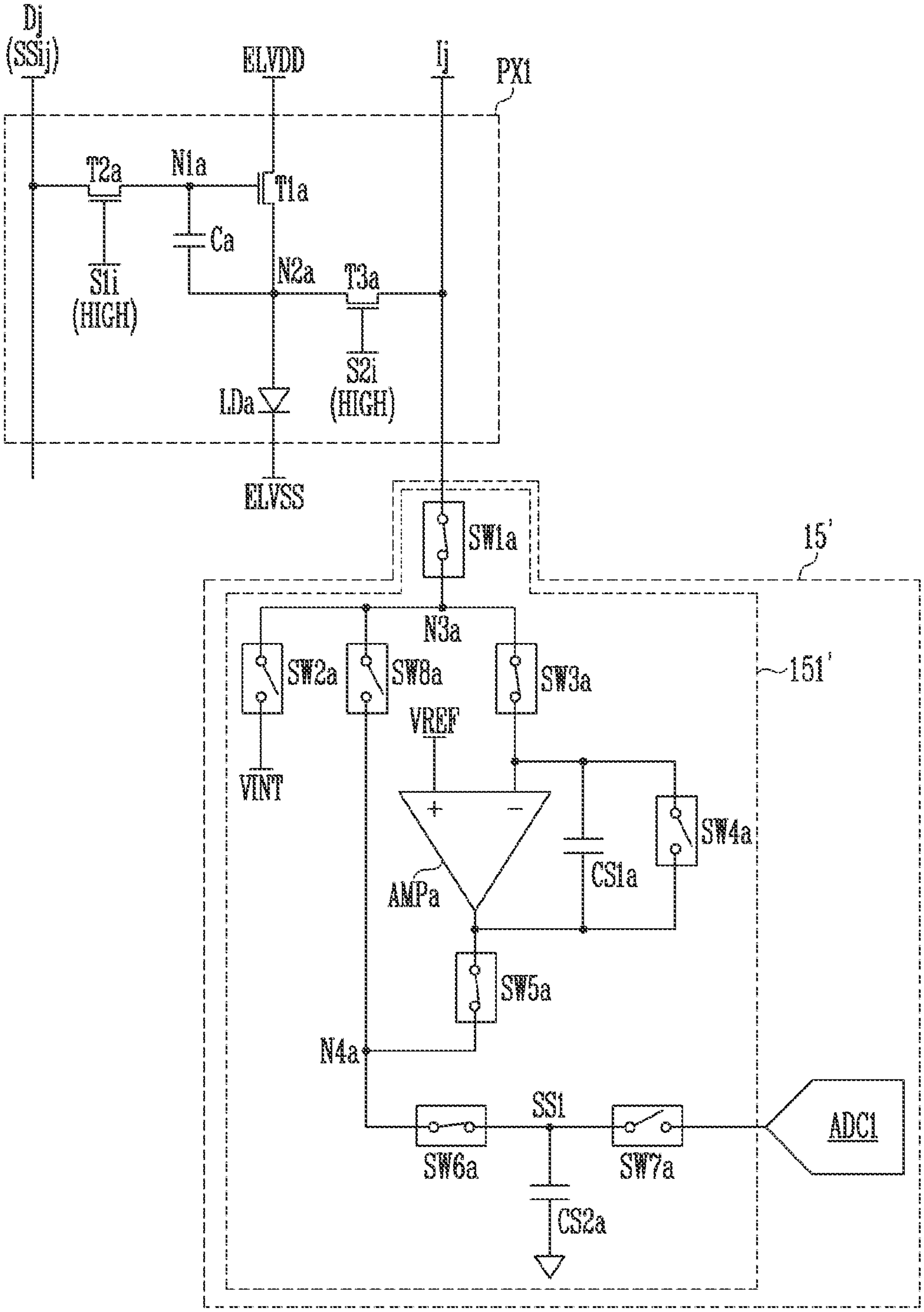
Figure 10:
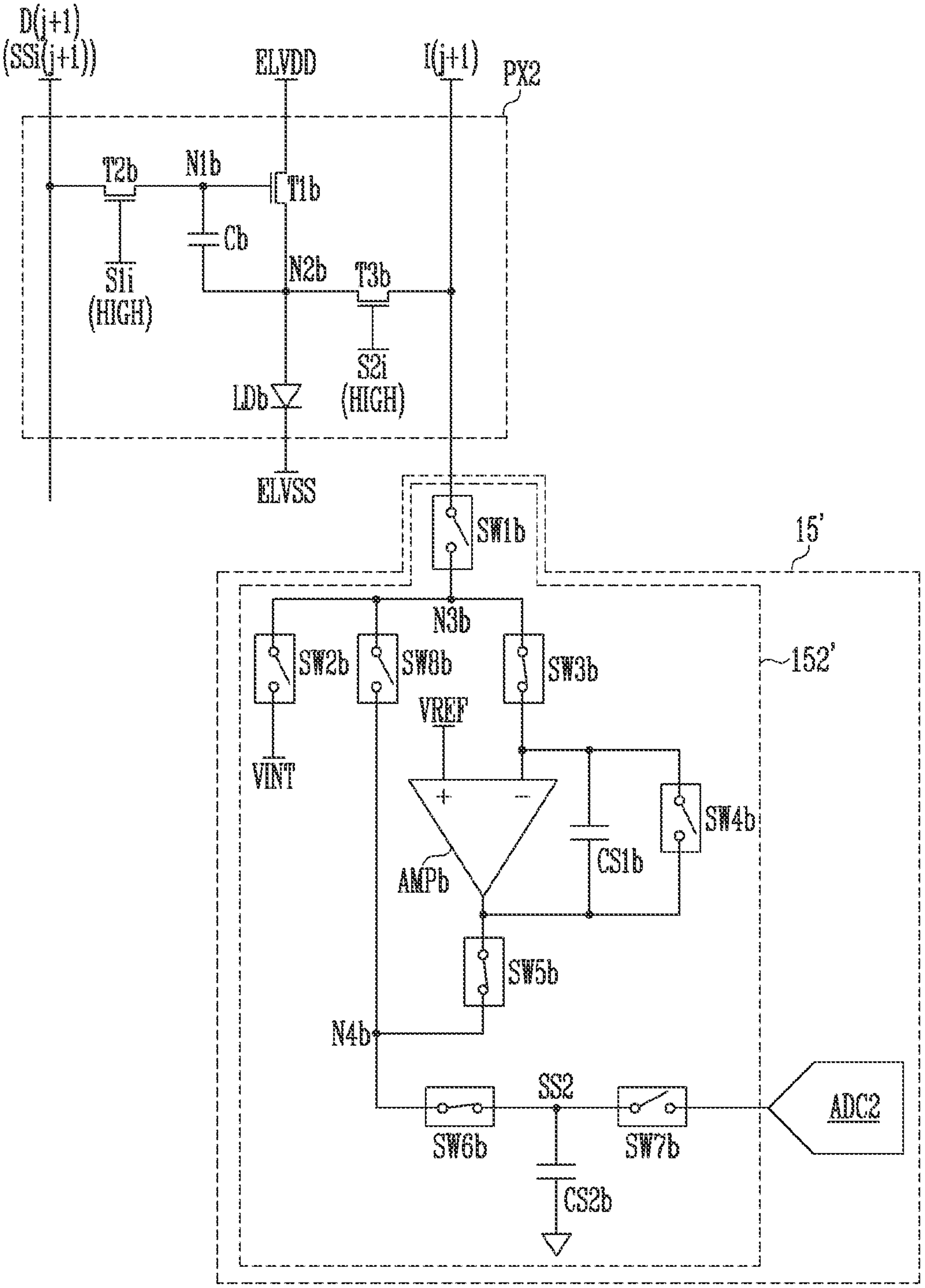

The first time t1 will be described with reference to FIGS. 9 and 10. The first period may be a first sensing period, and the first time t1 may be a first sensing time.

A first sensing channel 151' may further include a first switch SW1*a*, as compared to the first sensing channel 151 of FIG. 3. The first switch SW1*a* may include a first end coupled to the j-th sensing line Ij, and a second end coupled to the third node N3*a*. The other components of the first sensing channel 151' are substantially the same as those of the first sensing channel 151 of FIG. 3; therefore, repetitive explanation thereof will be omitted.

A second sensing channel 152' may further include a first switch SW1*b* as compared to the second sensing channel 152 of FIG. 4. The first switch SW1*b* may include a first end coupled to the j+l-th sensing line I(j+1), and a second end coupled to the third node N3*b*. The other components of the second sensing channel 152' are substantially the same as those of the second sensing channel 152 of FIG. 4; therefore, repetitive explanation thereof will be omitted.

During the first period, the first sensing channel 151' may store a first sampling signal SS1 in the first sampling capacitor CS2*a* by connecting the j-th sensing line Ij to the first sensing channel 151'. For example, the first switch SW1*a* may be in a turned-on state. A process of storing the first sampling signal SS1 is substantially the same as that described with reference to FIG. 6; therefore, repetitive explanation thereof will be omitted.

During the first period, the second sensing channel 152' may store a second sampling signal SS2 in the second sampling capacitor CS2*b* while disconnecting the j+l-th sensing line I(j+1) from the second sensing channel 152'. For example, the first switch SW1*b* may be in a turned-off state. Therefore, even when the first transistor T1*b* is in a turned-on state, sensing current may be prevented from flowing into the second sensing channel 152'. Therefore, the second sampling signal SS2 stored in the second sampling capacitor CS2*b* may include only noise information without including the characteristic information of the first transistor T1*b*.

Figure 11:
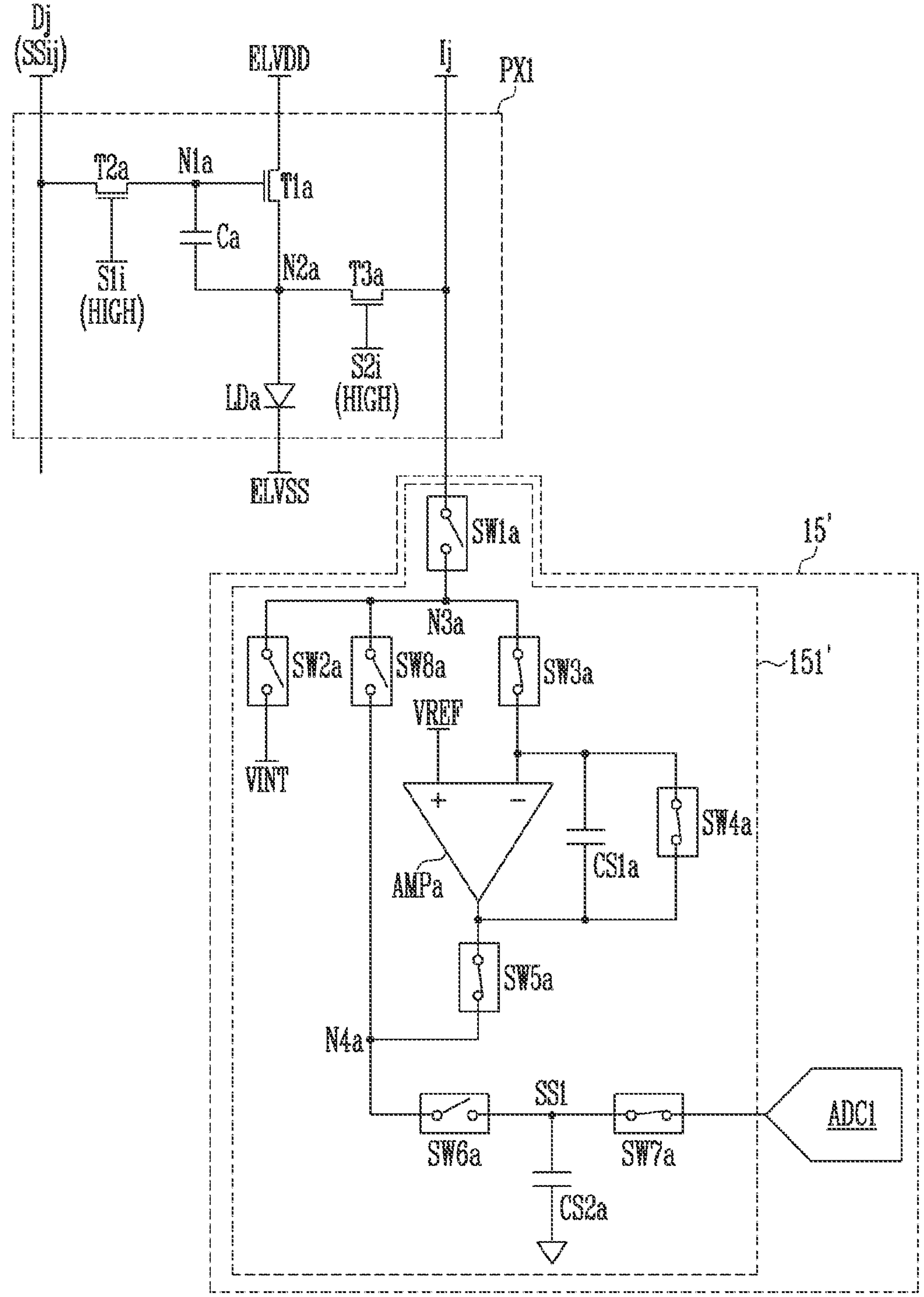
Figure 12:
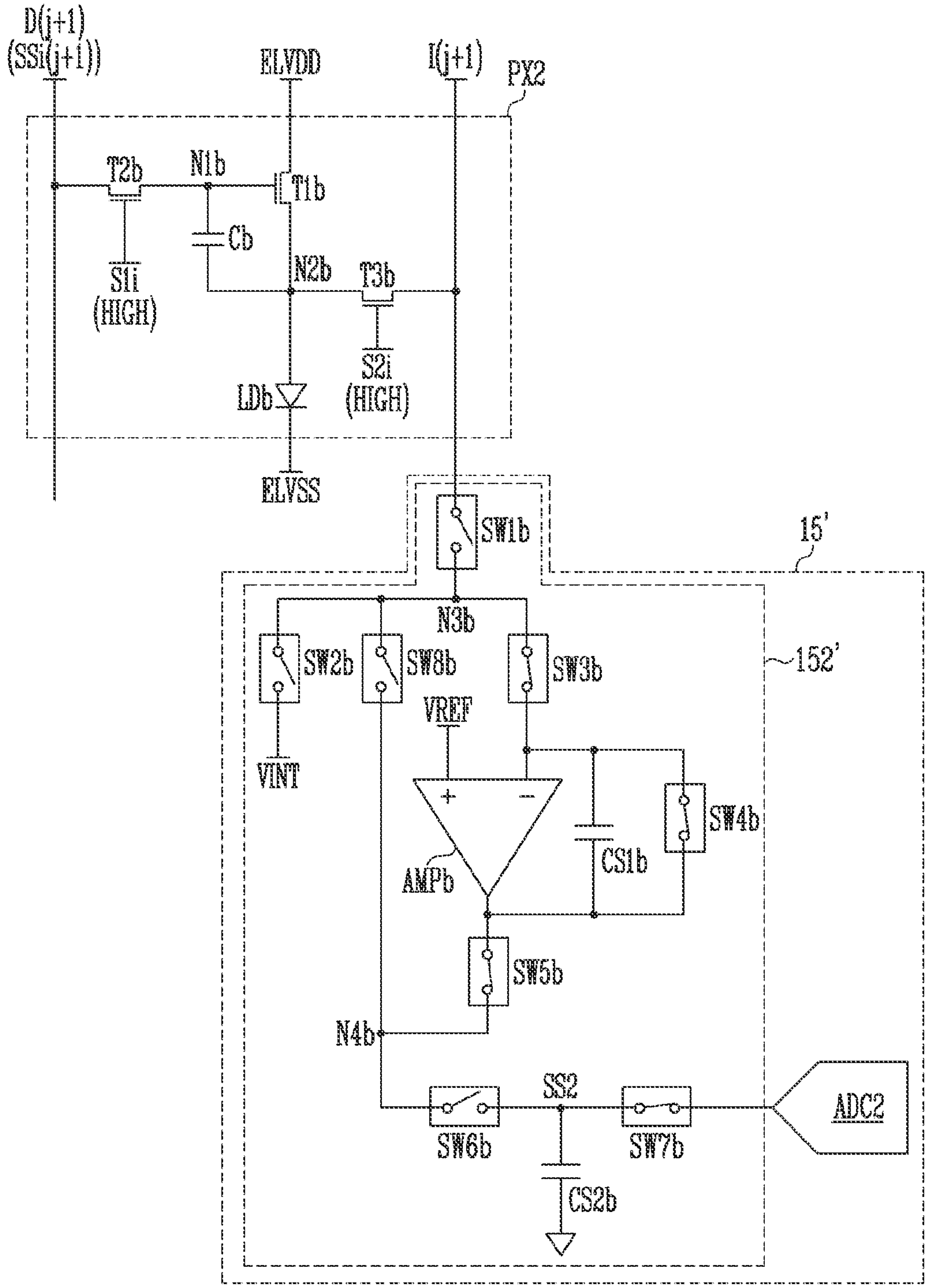

The second time t2 will be described with reference to FIGS. 11 and 12. The second period may be an initialization and conversion period. The second time t2 may be an initialization and conversion time. In some embodiments, depending on switching conditions, an initialization period and a conversion period may be separated from each other. The conversion period may correspond to any one of a period after the first period or a period before the third period.

During the second period, the first sensing channel 151' may initialize the first sensing capacitor CS1*a* while disconnecting the first sensing line Ij from the first sensing channel 151'. For example, the fourth switch SW4*a* may be turned on. Therefore, the voltages of the first and second electrodes of the first sensing capacitor CS1*a* become equal to each other, whereby the first sensing capacitor CS1*a* may be discharged. Here, the sixth switch SW6*a* is turned off, so that the initialization of the first sensing capacitor CS1*a* is prevented from affecting the first sampling signal SS1 stored in the first sampling capacitor CS2*a*.

During the second period, the second sensing channel 152' may initialize the second sensing capacitor CS1*b* while disconnecting the second sensing line I(j+1) from the second sensing channel 152'. For example, the fourth switch SW4*b* may be turned on. Therefore, the voltages of the first and second electrodes of the second sensing capacitor CS1*b* become equal to each other, whereby the second sensing capacitor CS1*b* may be discharged. Here, the sixth switch SW6*b* is turned off, so that the initialization of the second sensing capacitor CS1*b* is prevented from affecting the second sampling signal SS2 stored in the second sampling capacitor CS2*b*. In some embodiments, depending on switching conditions, the initialization period of the second sensing capacitor CS1*b* may differ from the initialization period of the first sensing capacitor CS1*a*.

During the conversion period, the seventh switches SW7*a* and SW7*b* may be turned on. Therefore, the analog-digital converters ADC1 and ADC2 may convert corresponding sampling signals SS1 and SS2 to digital signals. If the sensor 15' includes a single analog-digital converter, turn-on periods of the seventh switches SW7*a* and SW7*b* may not overlap with each other. As the first sampling signal SS1 and the second sampling signal SS2 are processed to obtain the characteristic information of the first transistor T1*a* by removing the common mode noise, characteristic information of the first transistor T1*a* from which the common mode noise has been removed may be acquired.

Figure 13:
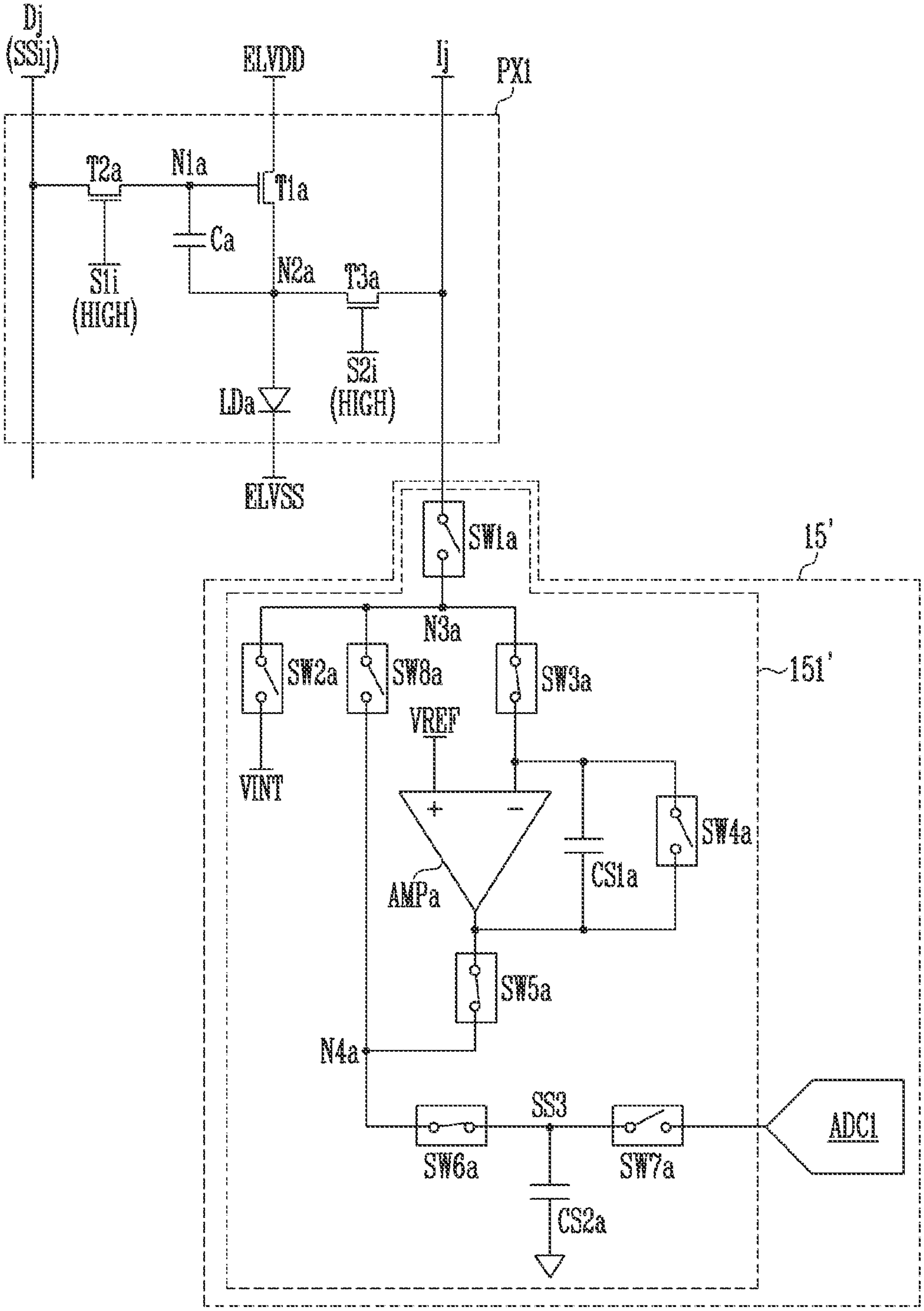
Figure 14:
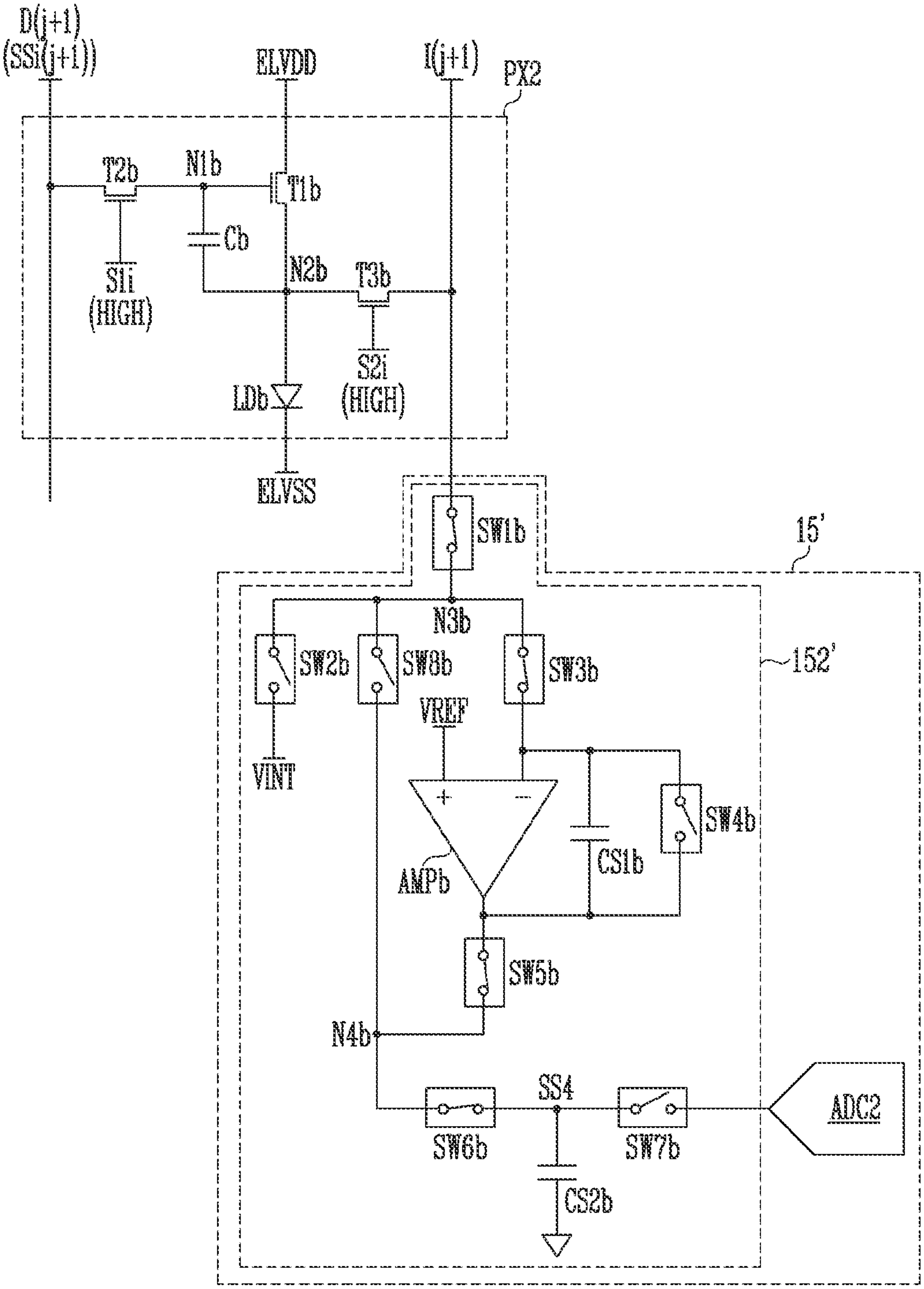

The third time t3 will be described with reference to FIGS. 13 and 14. The third period may be a second sensing period, and the third time t3 may be a third sensing time.

During the third period, the first sensing channel 151' may store a third sampling signal SS3 in the first sampling capacitor CS2*a* while disconnecting the j-th sensing line Ij from the first sensing channel 151'. For example, the first switch SW1*a* may be in a turned-off state. Therefore, even when the first transistor T1*a* is in a turned-on state, sensing current may be prevented from flowing through the first sensing channel 151'. Therefore, the third sampling signal SS3 stored in the first sampling capacitor CS2*a* may include only noise information without including the characteristic information of the first transistor T1*a*.

During the third period, the second sensing channel 152' may store a fourth sampling signal SS4 in the second sampling capacitor CS2*b* by connecting the j+l-th sensing line I(j+1) to the second sensing channel 152'. For example, the first switch SW1*b* may be in a turned-on state. A process of storing the fourth sampling signal SS4 is substantially the same as that described with reference to FIG. 6; therefore, repetitive explanation thereof will be omitted.

A fourth time t4 may be a time during the fourth period. A fifth time t5 may be a time during the fifth period. A sixth time t6 may be a time during the sixth period. The fourth period, the fifth period, and the sixth period may be sequential time and may not overlap with each other. During the fourth to sixth periods, characteristic information of the pixels PX5, PX6, PX7, and PX8 may be stored, and related contents may refer to the description of FIG. 1.

In the embodiments of FIGS. 8 to 14, it is possible to sense characteristic information of all of the pixels of the pixel circuits 14 during one sensing frame period SFRAME'. Thus, there is an advantage in that required sensing time may be reduced as compared to those of the embodiment of FIGS. 5 to 7 which include at least three sensing frame periods SFRAME1, SFRAME2, and SFRAME3. Furthermore, in the embodiments of FIGS. 8 to 14, as compared to the embodiment of FIGS. 5 to 7, the number of switching operations of transistors and switches is reduced, and the number of times signals are transmitted form the timing controller 11 to the data driver 12 is reduced. Therefore, the power consumption may be reduced.

Figure 15:
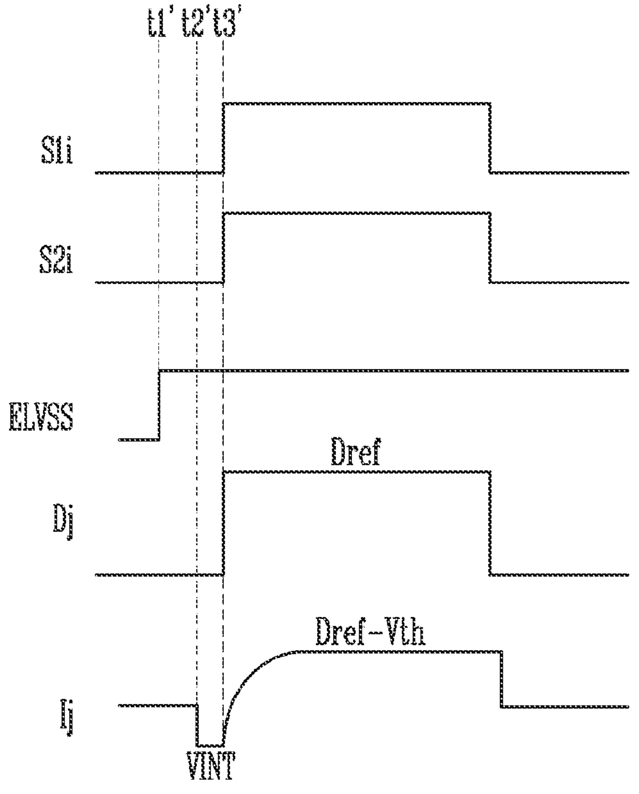
FIGS. 15 and 16 are diagrams for describing a method of driving the display device during a threshold voltage sensing period in accordance with an embodiment of the present disclosure.
Figure 16:
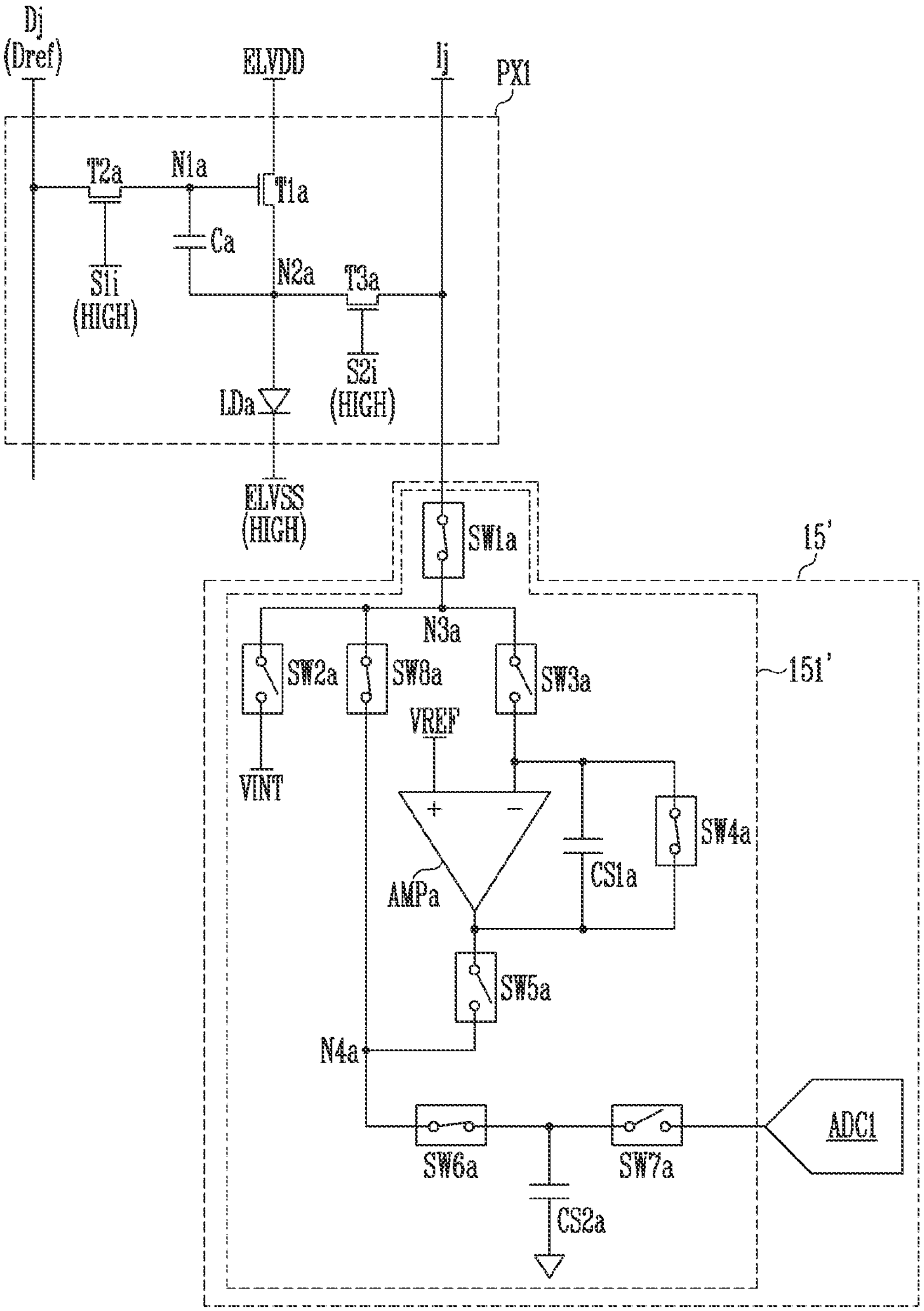

FIGS. 15 and 16 are diagrams for describing a method of driving the display device during a threshold voltage sensing period in accordance with an embodiment of the present disclosure.

Referring to FIG. 16, unlike the foregoing embodiments, the third switch SW3*a* and the fifth switch SW5*a* may remain turned off, and the eighth switch SW8*a* may remain turned on.

Referring to FIG. 15, at a first time t1', the voltage of the second power supply ELVSS is increased, so that the light emitting diode LDa may be prevented from emitting light.

Next, at a second time t2', since the second switch SW2*a* is turned on, the j-th sensing line Ij may be initialized to the voltage of the initialization power supply VINT.

At a third time t3', scan signals having a turn-on level may be applied to the i-th first scan line S1*i* and the i-th second scan line S2*i*. Here, a data reference voltage Dref may be applied to the j-th data line Dj. Therefore, the data reference voltage Dref may remain on the first node N1*a*. Also, the j-th sensing line Ij may be coupled to the second node N2*a*.

The voltage of the second node N2*a* may increase from the voltage of the initialization power supply VINT to a voltage corresponding to (Dref-Vth). If the voltage of the second node N2*a* increases to the voltage corresponding to (Dref-Vth), the first transistor T1*a* is turned off. Consequently, the voltage of the second node N2*a* no longer increases.

The sixth switch SW6*a* may be in a turned-on state. Hence, a sampling signal may be stored in the first sampling capacitor CS2*a*. Here, since the fourth node N4*a* and the second node N2*a* are coupled to each other, the sampling signal may include the threshold voltage value Vth of the first transistor T1*a*. After the seventh switch SW7*a* is turned on, the analog-digital converter ADC1 may convert the sampling signal to a digital signal to obtain the threshold voltage of the first transistor T1*a*.

In a display device and a method of driving the display device in accordance with an embodiment, different characteristics of transistors may be compensated for.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

a first pixel comprising a first scanning transistor coupled to a first scan line and a first data line and a first sensing transistor coupled to a first sensing line;

a second pixel comprising a second scanning transistor coupled to the first scan line and a second data line and a second sensing transistor coupled to a second sensing line; and a sensor, the sensor comprising:

a first sensing channel connected to the first sensing line through a first switch and including a first sampling capacitor; and a second sensing channel connected to the second sensing line through a second switch and including a second sampling capacitor, wherein, during a first period, the first sensing channel stores a first sampling signal in the first sampling capacitor while the first switch is turned on, and the second sensing channel stores a second sampling signal in the second sampling capacitor while the second switch is turned off.

2. The display device according to claim 1, wherein the first sensing channel further includes a first sensing capacitor, wherein the second sensing channel further includes a second sensing capacitor, and wherein the first sensing channel initializes the first sensing capacitor while the first switch is turned off during a second period following the first period.

3. The display device according to claim 2, wherein the second sensing channel initializes the second sensing capacitor while the second switch is turned off during the second period.

4. The display device according to claim 2, wherein the first sensing channel stores a third sampling signal in the first sampling capacitor while the first switch is turned off, and the second sensing channel stores a fourth sampling signal in the second sampling capacitor while the second switch is turned on during a third period following the second period.

5. The display device according to claim 4, wherein a scan signal having a turn-on level is applied to the first scan line during the first period and the third period.

6. The display device according to claim 5, wherein a scan signal having a turn-on level is applied to the first scan line during the second period.

7. The display device according to claim 5, wherein a level of a data voltage applied to the first data line is identical during the first period and the third period.

8. The display device according to claim 7, wherein a level of a data voltage applied to the second data line is identical during the first period and the third period.

9. The display device according to claim 8, wherein the level of the data voltage applied to the first data line is equal to the level of the data voltage applied to the second data line during the first period and the third period.

10. A method of driving a display device, comprising:

applying a scan signal having a turn-on level to a first scan line coupled to a first pixel and a second pixel;

turning on a first switch connected between the first pixel and a first sensing channel;

turning off a second switch connected between the second pixel and a second sensing channel;

storing a first sampling signal in a first sampling capacitor in the first sensing channel during a first period while the first switch is turned on; and storing a second sampling signal in a second sampling capacitor in the second sensing channel during the first period while the second switch is turned off.

11. The method according to claim 10, further comprising initializing a first sensing capacitor while the first switch is turned off during a second period following the first period.

12. The method according to claim 11, further comprising initializing a second sensing capacitor while the second switch is turned off during the second period.

13. The method according to claim 11, further comprising:

storing a third sampling signal in the first sampling capacitor while the first switch is turned off during a third period following the second period; and storing a fourth sampling signal in the second sampling capacitor while the second switch is turned on during the third period.

14. The method according to claim 13, wherein a scan signal having a turn-on level is applied to the first scan line during the first period and the third period.

15. The method according to claim 14, wherein a scan signal having a turn-on level is applied to the first scan line during the second period.

16. The method according to claim 14, wherein a level of a data voltage applied to a first data line connected to the first pixel is identical during the first period and the third period.

17. The method according to claim 16, wherein a level of a data voltage applied to a second data line connected to the second pixel is identical during the first period and the third period.

18. The method according to claim 17, wherein the level of the data voltage applied to the first data line is equal to the level of the data voltage applied to the second data line during the first period and the third period.

* * * * *